(12) United States Patent
Cecconi

(10) Patent No.: US 6,316,938 B1
(45) Date of Patent: Nov. 13, 2001

(54) MAGNETIC GAUGE FOR DETERMINING THE THICKNESS OF FILLER USED TO REPAIR VEHICLE DAMAGE

(76) Inventor: Sergio Cecconi, 507 Mansfield Village, Hackettstown, NJ (US) 07840

(*) Notice: Subject to any disclaimer, the term of this patent is extended or adjusted under 35 U.S.C. 154(b) by 0 days.

(21) Appl. No.: 09/545,898

(22) Filed: Apr. 8, 2000

(51) Int. Cl.[7] .............................. G01B 7/06; G01K 33/12
(52) U.S. Cl. ......................................................... 324/230
(58) Field of Search .................................. 324/228, 229, 324/230, 260, 262, 231

(56) References Cited

U.S. PATENT DOCUMENTS

| 4,425,546 | * | 1/1984 | Taylor | 324/230 |
| 4,733,178 | * | 3/1988 | Koch | 324/230 |
| 5,828,212 | * | 10/1998 | Nix | 324/230 |

* cited by examiner

Primary Examiner—Jay Patidar
Assistant Examiner—Amber Knox
(74) Attorney, Agent, or Firm—Goldstein Law Offices P.

(57) ABSTRACT

A magnetic gauge for determining vehicle body damage including a circular housing having a front face, a rear face and a hollow interior. The circular housing has a stem portion extending downwardly therefrom. The stem portion has a channel formed therein. The front face has a measuring gauge disposed therein. The measuring gauge includes a needle portion. The needle portion has an inner end. The inner end extends within the hollow interior. A magnet is slidably disposed within the channel of the stem portion of the circular housing. A shaft member is slidably disposed within the hollow interior of the circular housing. The shaft member includes a lower segment slidably disposed within the channel of the stem portion of the circular housing. The lower segment has a lower end secured to the magnet. The shaft member with the inner end of the needle portion whereby upward movement of the shaft member will advance the needle with respect to the measuring gauge.

5 Claims, 2 Drawing Sheets

MAGNETIC GAUGE FOR DETERMINING THE THICKNESS OF FILLER USED TO REPAIR VEHICLE DAMAGE

BACKGROUND OF THE INVENTION

The present invention relates to a magnetic gauge for determining vehicle body damage and more particularly pertains to measuring the thickness of filler used to repair a damaged vehicle.

The use of measuring devices is known in the prior art. More specifically, measuring devices heretofore devised and utilized for the purpose of measuring thicknesses are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,828,212 to Nix discloses the use of a magnetic field sensor for measuring the thickness of a layer of paint on a vehicle to determine prior repairs of damage. U.S. Pat. No. 4,733,178 to Koch discloses a magnetic thickness gauge for measuring the thickness of a a nonmagnetic coating on a magnetizable material. U.S. Pat. No. 2,903,645 to Wright and U.S. Pat. No. 4,425,546 to Taylor disclose additional constructions for magnetic coating thickness gauges.

While these devices fulfill their respective, particular objective and requirements, the aforementioned patents do not describe a magnetic gauge for determining vehicle body damage for measuring the thickness of filler used to repair a damaged vehicle.

In this respect, the magnetic gauge for determining vehicle body damage according to the present invention substantially departs from the conventional concepts and designs of the prior art, and in doing so provides an apparatus primarily developed for the purpose of measuring the thickness of filler used to repair a damaged vehicle.

Therefore, it can be appreciated that there exists a continuing need for a new and improved magnetic gauge for determining vehicle body damage which can be used for measuring the thickness of filler used to repair a damaged vehicle. In this regard, the present invention substantially fulfills this need.

SUMMARY OF THE INVENTION

In the view of the foregoing disadvantages inherent in the known types of measuring devices now present in the prior art, the present invention provides an improved magnetic gauge for determining vehicle body damage. As such, the general purpose of the present invention, which will be described subsequently in greater detail, is to provide a new and improved magnetic gauge for determining vehicle body damage which has all the advantages of the prior art and none of the disadvantages.

To attain this, the present invention essentially comprises a circular housing having a front face, a rear face and a hollow interior. The circular housing has a stem portion extending downwardly therefrom. The stem portion has a channel formed therein. The stem portion has a lower end. The lower end has a pair of wheels coupled thereto. The front face has a measuring gauge disposed therein. The measuring gauge includes a needle portion. The needle portion has an inner end. The inner end extends within the hollow interior. The inner end has a ratchet wheel disposed thereon. The ratchet wheel is defined by a plurality of circumferentially disposed teeth. A magnet is slidably disposed within the channel of the stem portion of the circular housing. A shaft member is slidably disposed within the hollow interior of the circular housing. The shaft member includes a lower segment slidably disposed within the channel of the stem portion of the circular housing. The lower segment has a lower end secured to the magnet. The shaft member has a plurality of teeth. The plurality of teeth are engaged with the circumferentially disposed teeth of the ratchet wheel whereby upward movement of the shaft member will advance the ratchet wheel which will advance the needle with respect to the measuring gauge. A coil spring is disposed within the hollow interior of the circular housing. The coil spring is coupled with the shaft member. The coil spring urges the shaft member upwardly with respect to the circular housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnetic gauge for determining vehicle body damage which has all the advantages of the prior art measuring devices and none of the disadvantages.

It is another object of the present invention to provide a new and improved magnetic gauge for determining vehicle body damage which may be easily and efficiently manufactured and marketed.

It is a further object of the present invention to provide a new and improved magnetic gauge for determining vehicle body damage which is of durable and reliable construction.

An even further object of the present invention is to provide a new and improved magnetic gauge for determining vehicle body damage which is susceptible of a low cost of manufacture with regard to both materials and labor, and which accordingly is then susceptible of low prices of sale to the consuming public, thereby making such a magnetic gauge for determining vehicle body damage economically available to the buying public.

Even still another object of the present invention is to provide a new and improved magnetic gauge for determining vehicle body damage for measuring the thickness of filler used to repair a damaged vehicle.

Lastly, it is an object of the present invention to provide a new and improved magnetic gauge for determining vehicle body damage including a circular housing having a front face, a rear face and a hollow interior. The circular housing has a stem portion extending downwardly therefrom. The stem portion has a channel formed therein. The front face has a measuring gauge disposed therein. The measuring gauge includes a needle portion. The needle portion has an inner end. The inner end extends within the hollow interior. A magnet is slidably disposed within the channel of the stem portion of the circular housing. A shaft member is slidably disposed within the hollow interior of the circular housing. The shaft member includes a lower segment slidably disposed within the channel of the stem portion of the circular housing. The lower segment has a lower end secured to the magnet. The shaft member with the inner end of the needle portion whereby upward movement of the shaft member will advance the needle with respect to the measuring gauge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 2:
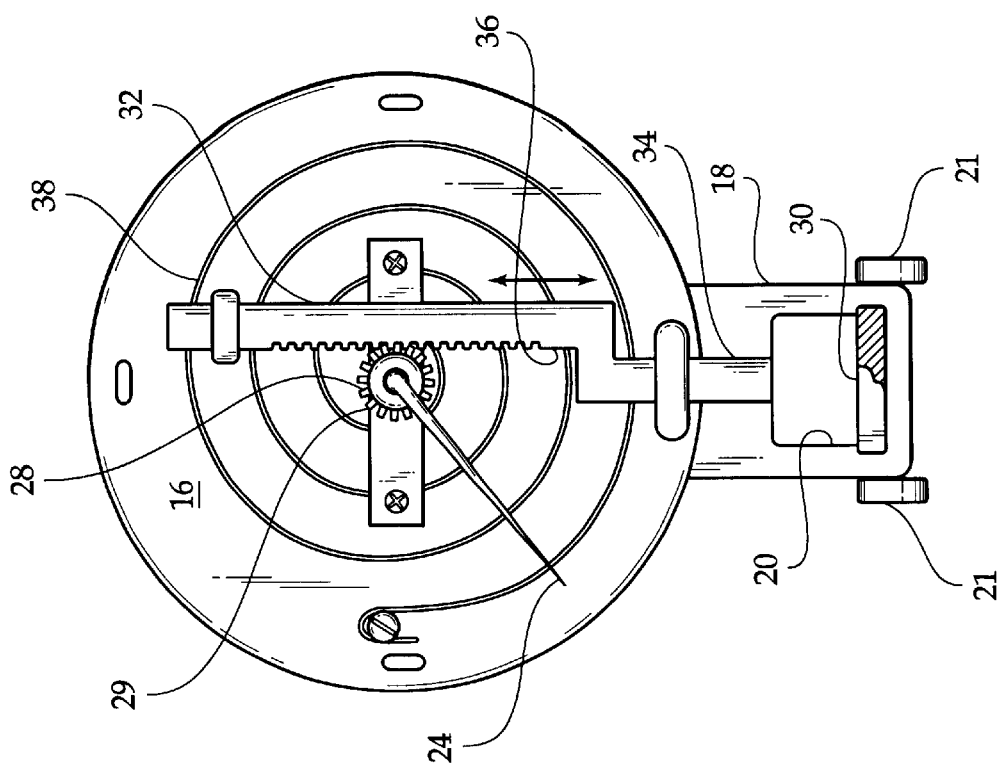
FIG. 2 is a cross-sectional front view of the present invention.
Figure 1:
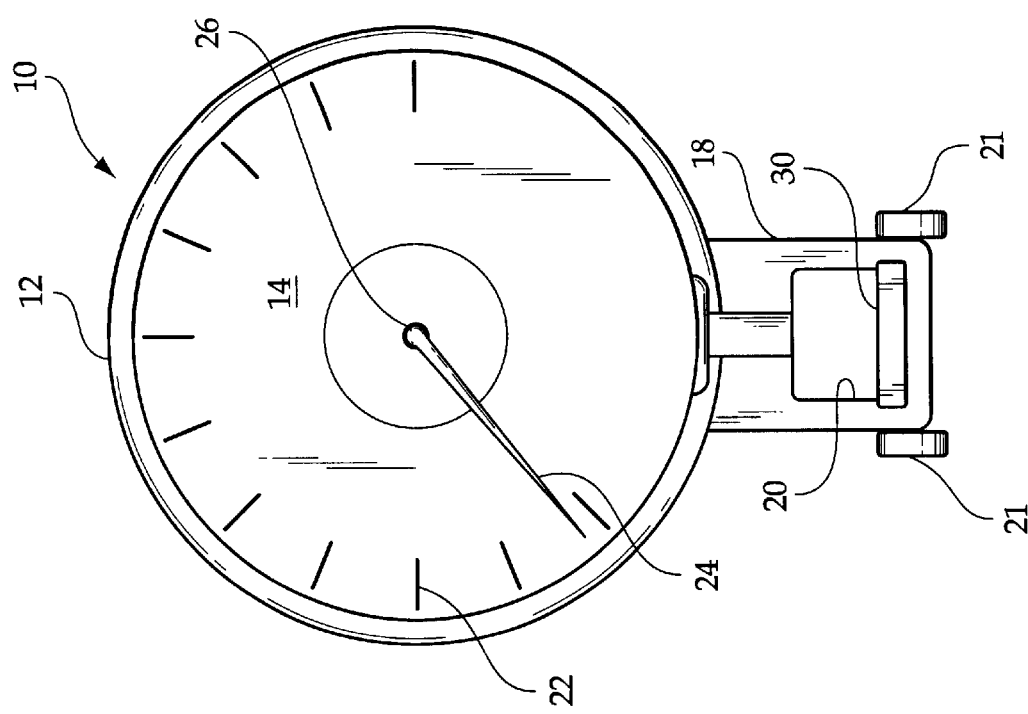
FIG. 1 is a front view of the preferred embodiment of the magnetic gauge for determining vehicle body damage constructed in accordance with the principles of the present invention.
Figure 3:
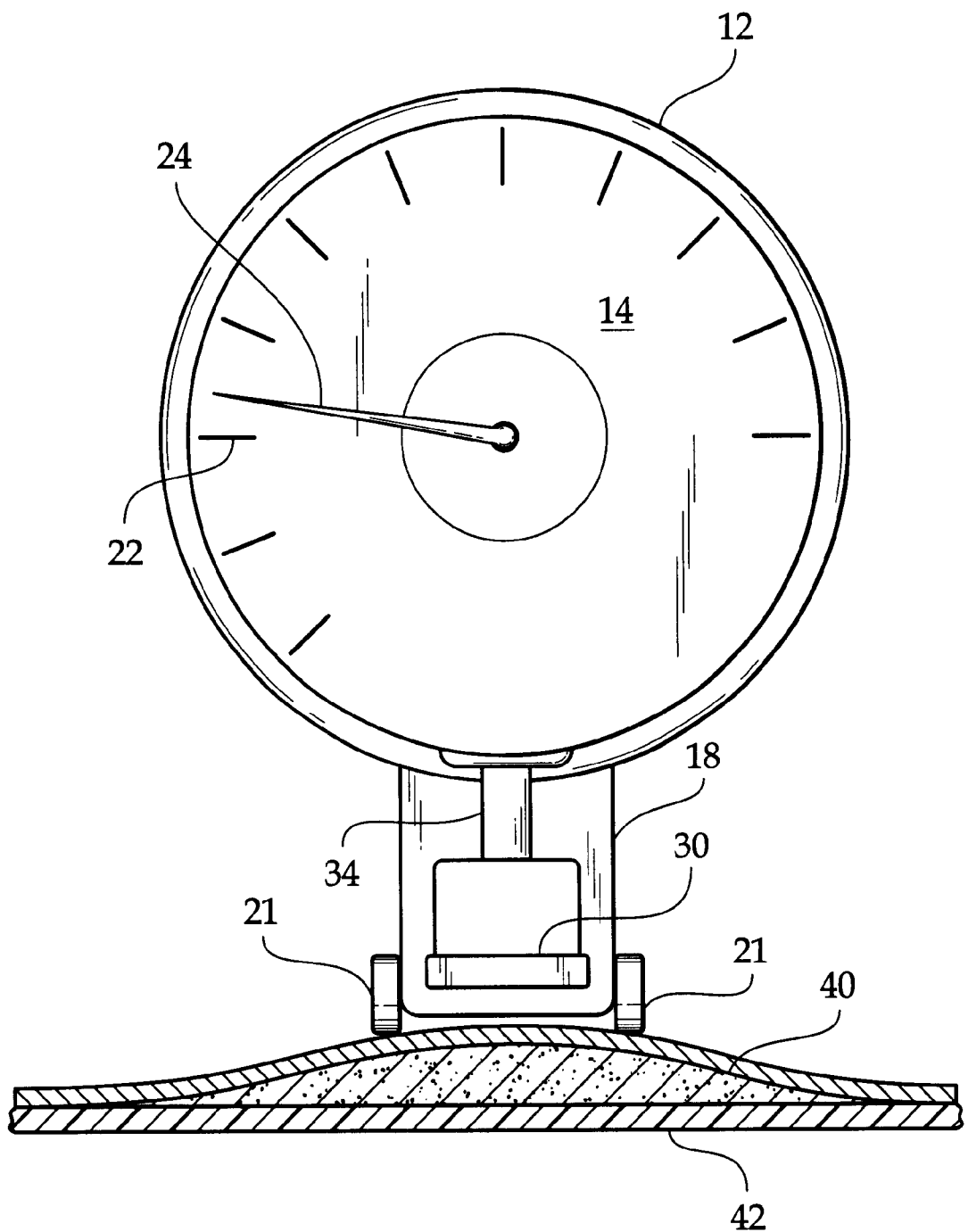
FIG. 3 is a front view of the present invention illustrated in use.

With reference now to the drawings, and in particular, to FIGS. 1 through 3 thereof, the preferred embodiment of the new and improved magnetic gauge for determining vehicle body damage embodying the principles and concepts of the present invention and generally designated by the reference number 10 will be described.

Specifically, it will be noted in the various Figures that the device relates to a magnetic gauge for determining vehicle body damage for measuring the thickness of filler used to repair a damaged vehicle. In its broadest context, the device consists of a circular housing, a magnet, a shaft member, and a coil spring. Such components are individually configured and correlated with respect to each other so as to attain the desired objective.

The circular housing 12 has a front face 14, a rear face 16 and a hollow interior. The circular housing 12 has a stem portion 18 extending downwardly therefrom. The stem portion 18 has a channel 20 formed therein. The stem portion 18 has a lower end. The lower end has a pair of wheels 21 coupled thereto. The wheels 21 allow the device 10 to be maneuvered along the surface of the vehicle. The front face 14 has a measuring gauge 22 disposed therein. The measuring gauge 22 includes a needle portion 24. The needle portion 24 has an inner end 26. The inner end 26 extends within the hollow interior. The inner end 26 has a ratchet wheel 28 disposed thereon. The ratchet wheel 28 is defined by a plurality of circumferentially disposed teeth 29.

The magnet 30 is slidably disposed within the channel 20 of the stem portion 18 of the circular housing 12. The magnet 30 will be attracted to the metallic surface of the vehicle. Once the magnet 30 comes across a repaired portion of the vehicle, the magnet's 30 strength will be reduced thereby indicating a repaired area of the vehicle.

The shaft member 32 is slidably disposed within the hollow interior of the circular housing 12. The shaft member 32 includes a lower segment 34 slidably disposed within the channel 20 of the stem portion 18 of the circular housing 12. The lower segment 34 has a lower end secured to the magnet 30. The shaft member 32 has a plurality of teeth 36. The plurality of teeth 36 are engaged with the circumferentially disposed teeth 29 of the ratchet wheel 28 whereby upward movement of the shaft member 32 will advance the ratchet wheel 28 which will advance the needle 24 with respect to the measuring gauge 22.

The coil spring 38 is disposed within the hollow interior of the circular housing 12. The coil spring 38 is coupled with the shaft member 32. The coil spring 38 urges the shaft member 32 upwardly with respect to the circular housing 12.

In use, the circular housing 12 is placed on the surface of the vehicle. Using the pair of wheels 21, the circular housing 12 is rolled along the surface of the vehicle. When in use, the magnet 20 is attracted to the metallic surface of the vehicle against the urging of the coil spring 38. Once the magnet 30 is positioned over a repaired area that has an epoxy or filler 40 disposed above the metallic surface 42, the magnetic pull of the magnet 30 will be reduced thereby causing the coil spring 38 to retract thereby advancing the needle portion 24 with respect to the measuring gauge 22 to indicate a level of epoxy or filler. Note FIG. 3.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A magnetic gauge for determining vehicle body damage for measuring the thickness of filler used to repair a damaged vehicle comprising, in combination:

a circular housing having a front face, a rear face and a hollow interior, the circular housing having a stem portion extending downwardly therefrom, the stem portion having a channel formed therein, the stem portion having a lower end, the lower end having a pair of wheels coupled thereto, the front face having a measuring gauge disposed therein, the measuring gauge including a needle portion, the needle portion having an inner end, the inner end extending within the hollow interior, the inner end having a ratchet wheel disposed thereon, the ratchet wheel being defined by a plurality of circumferentially disposed teeth;

a magnet slidably disposed within the channel of the stem portion of the circular housing;

a shaft member slidably disposed within the hollow interior of the circular housing, the shaft member including a lower segment slidably disposed within the channel of the stem portion of the circular housing, the lower segment having a lower end secured to the magnet, the shaft member having a plurality of teeth, the plurality of teeth being engaged with the circumferentially disposed teeth of the ratchet wheel whereby upward movement of the shaft member will advance the ratchet wheel which will advance the needle with respect to the measuring gauge;

a coil spring disposed within the hollow interior of the circular housing, the coil spring being coupled with the shaft member, the coil spring urging the shaft member upwardly with respect to the circular housing.

2. A magnetic gauge for determining vehicle body damage for measuring the thickness of filler used to repair a damaged vehicle comprising, in combination:

a circular housing having a front face, a rear face and a hollow interior, the circular housing having a stem portion extending downwardly therefrom, the stem portion having a channel formed therein, the front face having a measuring gauge disposed therein, the measuring gauge including a needle portion, the needle portion having an inner end, the inner end extending within the hollow interior;

a magnet slidably disposed within the channel of the stem portion of the circular housing;

a shaft member slidably disposed within the hollow interior of the circular housing, the shaft member including a lower segment slidably disposed within the channel of the stem portion of the circular housing, the lower segment having a lower end secured to the magnet, the shaft member coupled with the inner end of the needle portion whereby upward movement of the shaft member will advance the needle with respect to the measuring gauge.

3. The magnetic gauge for determining vehicle body damage as set forth in claim 2 wherein the stem portion of the circular housing has a lower end, the lower end having a pair of wheels coupled thereto.

4. The magnetic gauge for determining vehicle body damage as set forth in claim 2 wherein the inner end of the needle portion has a ratchet wheel disposed thereon, the ratchet wheel being defined by a plurality of circumferentially disposed teeth, the shaft member having a plurality of teeth, the plurality of teeth being engaged with the circumferentially disposed teeth of the ratchet wheel.

5. The magnetic gauge for determining vehicle body damage as set forth in claim 2 and further including a coil spring disposed within the hollow interior of the circular housing, the coil spring being coupled with the shaft member, the coil spring urging the shaft member upwardly with respect to the circular housing.

* * * * *